(12) United States Patent
Li

(10) Patent No.: US 9,997,801 B2
(45) Date of Patent: Jun. 12, 2018

(54) FLEXIBLE ION CONDUCTIVE MEMBRANE FOR BATTERIES

(71) Applicant: BETTERGY CORP., Peekskill, NY (US)

(72) Inventor: Lin-Feng Li, Croton-on-Hudson, NY (US)

(73) Assignee: BETTERGY CORP., Peekskill, NY (US)

( * ) Notice: Subject to any disclaimer, the term of this patent is extended or adjusted under 35 U.S.C. 154(b) by 674 days.

(21) Appl. No.: 14/631,073

(22) Filed: Feb. 25, 2015

(65) Prior Publication Data

US 2015/0255769 A1 Sep. 10, 2015

Related U.S. Application Data

(60) Provisional application No. 61/947,648, filed on Mar. 4, 2014.

(51) Int. Cl.
| | | |
|---|---|---|
| *H01M 10/056* | (2010.01) | |
| *H01M 10/052* | (2010.01) | |
| *H01M 2/16* | (2006.01) | |
| *H01M 2/14* | (2006.01) | |

(52) U.S. Cl.
CPC ....... *H01M 10/052* (2013.01); *H01M 2/1646* (2013.01); *H01M 2/1653* (2013.01); *H01M 2/1686* (2013.01); *H01M 10/056* (2013.01); *H01M 2/145* (2013.01)

(58) Field of Classification Search
None
See application file for complete search history.

(56) References Cited

U.S. PATENT DOCUMENTS

2004/0197662 A1* 10/2004 Maruyama ............... C08F 8/14
429/303

FOREIGN PATENT DOCUMENTS

JP 2011-180469 * 9/2011

OTHER PUBLICATIONS

Eftekhari, Ali, Potassium secondary cell based on Prussian blue cathode, Journal of Power Sources 126 (2004) 221-228 (Year: 2004).*
Liquid Electrolyte Lithium/Sulfur Battery: Fundamental Chemistry, Problems, and Solutions, Sheng S. Zhang, Journal of Power Sources 231 (2013) 153-162.
Improved Cyclability of Liquid Electrolyte Lithium/Sulfur Batteries by Optimizing Electrolyte/Sulfur Ratio, Sheng S. Zhang, Energies 2012, 5, 5190-5197.
A Lithium/Dissolved Sulfur Battery With an Organic Electrolyte, R. D. Rauh, K. M. Abraham, G. F. Pearson, J. K. Surprenant, and S. B. Brummer, J. Electrochem. Soc.: Electrochemical Science and Technology Apr. 1979, pp. 523-527.
Electrochemistry of Polynuclear Transition Metal Cyanides: Prussian Blue and Its Analgoues, Kingo Itaya and Isamu Uchida, Acc. Chem. Res. 1986, 19, p. 162.

* cited by examiner

*Primary Examiner* — Maria Laios
(74) *Attorney, Agent, or Firm* — Karl F. Milde, Jr.; Eckert Seamans Cherin & Mellott, LLC

(57) ABSTRACT

In an improved lithium sulfur battery, an improvement comprises an effective Prussian blue dense membrane interposed between the anode and the cathode.

4 Claims, 1 Drawing Sheet

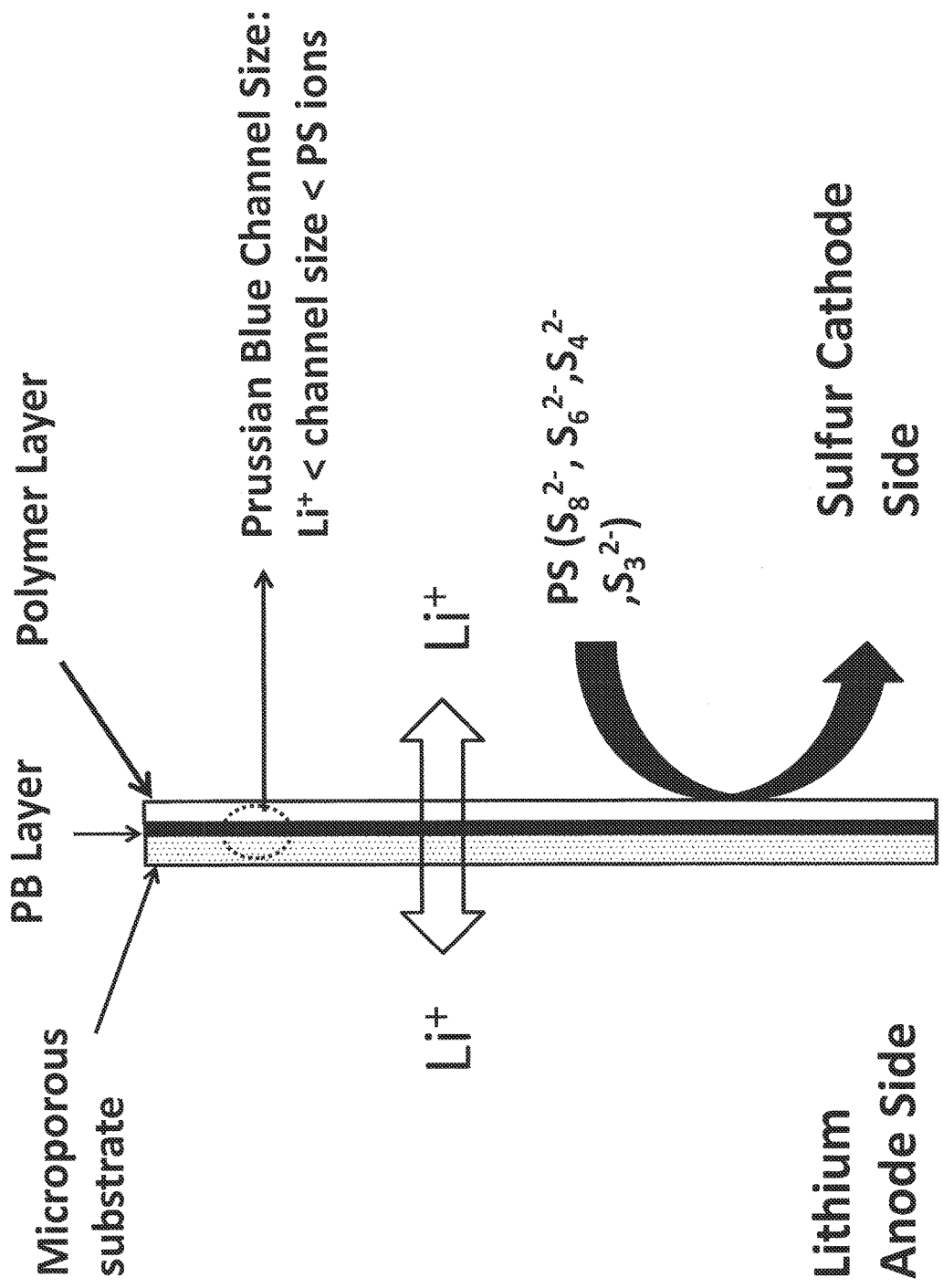

FLEXIBLE ION CONDUCTIVE MEMBRANE FOR BATTERIES

CROSS-REFERENCE TO RELATED APPLICATION

This application is based upon and claims the priority of U.S. Provisional Patent Application Ser. No. 61/947,648, filed Mar. 4, 2014, which is incorporated herein by reference in its entirety.

OVERVIEW

In this invention, a novel flexible ion selective membrane based on the Prussian blue and microporous substrate will be proposed and developed to address the critical issues facing the development of lithium sulfur battery. In combination with $Li_2S$ cathode and lithium free anode, a high energy density, low cost and safe battery can be developed to meet the long range EV requirements.

IMPACT

There is a continuing driving force to develop the higher energy density battery that can be used for long range EVs, and current lithium ion batteries cannot meet the increasing call for longer range EV requirements. Lithium sulfur batteries have been considered one of the most promising candidates for long range EVs due to their usage of low cost sulfur material ($0.57/kg) and their high theoretical specific energy (2680 Wh/kg)—about 4.6 times higher than that of the conventional lithium ion battery. S. Zhang, *J. Power Sources*, 2013, 231, 153; S. Zhang, *Energies*, 2012, 5, 5190. The theoretical energy density of Li/S battery (i.e., 2967 Wh/L) is also 1.6 times higher than that of the conventional lithium ion battery. The next generation Li—S battery could provide EVs with much needed 300-mile range without huge price tag associated with the current EVs (such as Tesla Model S with price tag of $100,000). Seer teslamotors.com. In fact, a few companies, such as Sion Power, PolyPlus, Oxis and NOHMs have focused their business on the development and commercialization of this technology. However, even with over three-decades of R&D effort (R. D. Rauh, K. M. Abraham, G. F. Pearson, J. K. Suprenant, S. B. Brummer, *J. Electrochem. Soc.*, 1979, 126, 523), a commercial Li/S battery has yet to be introduced into the market due to many challenge issues facing the battery chemistry, including short cycle life, low cycling efficiency and high self-discharge rate and perhaps the safety concerns associated with lithium metal electrode. There exists a strong market pull for alternative pathways to develop the battery to meet the EV battery requirements.

STATE OF THE ART

As we know, sulfur discharging on the conductive carbon surface involves multiple steps generating polysulfide ions (PSs: $S_8^{2-}, S_6^{2-}, S_4^{2-}, S_3^{2-}, S_2^{2-}, S^{2-}$) as the reduction intermediates. All of the Li/S battery problems are essentially rooted on the dissolution of the PS ions in the electrolyte. These PS ions can migrate quickly toward the lithium anode side and react with the lithium metal, causing self-discharge, low Coulombic efficiency and short cycle life. Hence, blocking PS shuttling is of paramount importance for the successful development of the Li/S battery. Several approaches have been explored in order to tackle this problem. Among them, lithium metal protection with solid state lithium ion conductive non-porous glass (or glass-ceramic) electrolyte (e.g., $Li_2S$—$P_2S_5$ type SSE) is now considered as the best option for preventing the PS shuttling. Such SSE membrane has shown excellent PS blocking capability, however, 1) it is too thick (>150 μm) and brittle; 2) it has low ionic conductivity (~0.1-1 mS/cm); 3) it is very expensive (>$4000/m²); and 4) it is hard to manufacture. (Up to now, only 6 inch SSE wafer has been produced by Ohara. See oharacorp.com). Therefore, batteries made of this SSE membrane separator exhibit low power capability and high cost, and thus cannot meet the long range EV battery requirements. A new, out-of-the-box idea is needed to solve such critical issues.

BRIEF DESCRIPTION OF THE DRAWING

FIG. 1 is an illustration of an embodiment of the invention for a lithium sulfur battery.

DETAILED DESCRIPTION OF THE INVENTION

As shown in FIG. 1, our proposed membrane is made of microporous substrate, Prussian blue (PB) dense membrane layer and thin ion conductive polymer layer. The PB layer is the core of our technology.

Ion Sieving Effect.

PB and its analogues are known to exhibit an open zeolitic structure with channel size of 0.32 nm. K. Itaya, I. Uchida, V. D. Neff, *Acc. Chem. Res.*, 1986, 19, 162. The specific capability to intercalate the alkali ions has led to its applications for sensors, ion selective electrode coating as well as battery materials. Because of its small rigid channel size, only small alkali ions (e.g., $Li^+$) can pass through the structure, PSs cannot pass through since the diameter of the smallest PS ions (i.e., $S^{2-}$:0.38 nm) is bigger than the zeolitic channel size. Additionally, the solvation and repulsion between the negative charge of PS ions and $CN^-$ in the PB framework will further enhance the ion selectivity of the membrane (ref FIG. 1).

High Ion Conductivity.

Recent publications have shown that $Li^+$ or $Na^+$ have very fast diffusivity inside the zeolitic channel of PB, as evidenced by super high rate capability (80° C.) of the cell. N. Imanishi, et al. *J. Power Sources*, 1999, 79, 215; C. D. Wessells, R. A. Huggins, Y. Cul, *Nature Comm.*, 2011, 2, 550; C. D. Wessas, S. V. Peddada, R. A. Huggins, Y. Cui., *Nano Lett.*, 2011, 11, 5421. In fact, $Li^+$ diffusivity in PB is $\sim 2 \times 10^{-9}$ cm²·s⁻¹, which is 2-3 orders of magnitude higher than that in $(Li_2S)_7$—$(P_2S_5)$ glass SSE ($10^{-11}$-$10^{-12}$ cm²·s⁻¹). Li ion diffusivity in $LiCoO_2$ is about $10^{-11}$ cm²·s⁻¹; in graphitized MCMB is $10^{-10}$-$10^{-9}$ cm²·s⁻¹. Hence, it is expected that our proposed membrane will have higher lithium ion conductivity than glass SSE. Moreover, since the dense PB layer is less than 1 μm thick, the overall membrane thickness will be close to the substrate thickness (~25 μm). In addition, PB has a very stable structure and its channel size can be fine-tuned as well by changing M in $M[Fe(CN)_6]_x$(M=Co, Fe, Ni, Cu, Zn, Mn and Cd).

Preparation Method.

PB films are normally prepared with electrochemical deposition, casting or dip coating, spin coating from colloidal solution. Multiple sequential adsorption (MSA) technique allows for the preparation of dense, defect free films on various supports including polymers. Submicron thickness membranes have been successfully produced with such method without defect. W. Jin, A. Toutianoush, M. Pyrasch, J. Schnepf, H. Gottschalk, W. Rammensee, B. Tieke, *J.*

*Phys. Chem. B,* 2003, 107, 12062; M. Pyrach, B. Tieke, Langmuir, 2001, 17, 7706. In our approach, microporous or composite substrate used in lithium ion battery will be used as the support of the membrane. With the MSA technique, a submicron layer of PB membrane will be deposited on the substrate surface. Due to its thickness and fast lithium ion diffusivity in PB zeolitic channels, it is expected that lithium ion conductivity of the membrane will be very close to that attic pristine microporous substrate. With additional ion conductive polymer coating, the PB membrane layer will be encapsulated inside two layers of the support to prevent the damage in cell manufacturing processes. Such membrane will be able to transport $Li^+$ while blocking the PS shuttling in the LiIS battery. It is also conceivable that this technique can be scaled up in a continuous manner with multiple dipping solutions.

This is just one example of how to prepare the membrane as described in this invention.

Cost.

Prussian blue is a very tow cost material. The processes of making our membrane involves only MSA and polymer coating at ambient condition, hence the overall cost of the membrane separator will not be substantially higher than the cost of the microporous substrate used in lithium ion batteries, which has 50-100 times less cost than glass SSE.

TABLE 1

Comparison of Bettergy's Ion Conductive Membrane with the SSE Membrane.

| Parameters | SSE Membrane | Bettergy's Ion Conductive Membrane |
|---|---|---|
| Li + conductivity, mS/cm | 0.1-1 | 5-15 |
| Ion selectivity | perselective | perselective |
| Thickness, μm | 150 | 25 |
| Brittleness | brittle | flexible |
| Area specific resistance | high | low |
| PS ion blocking capability | excellent | excellent |
| Cost, $/m² | 2000-4000 | ~40 |
| Scalability | Difficult, piece by piece | Continuous manufacturing |

In summary, as compared with the state-of-the-art glass SSE (Table 1), our ion conductive not only has the PS ion blocking capability but also has superior ion conductivity, mechanical properties and, more importantly, it can be produced in a low cost manner. In combination with $Li_2S$-carbon composite cathode and lithium free anode, a high energy density (>400 Wh/kg), low cost and safe lithium sulfur battery can be developed and commercialized to meet long range EV application requirements.

I claim:

1. A lithium sulfur battery having an anode and a cathode, wherein the improvement comprises a Prussian blue dense membrane is interposed between the anode and the cathode.

2. The battery of claim 1, wherein the Prussian blue dense membrane comprises a layer of Prussian blue supported by a microporous substrate layer.

3. The battery of claim 1, wherein the Prussian blue dense membrane comprises a polymer layer.

4. The battery of claim 1, wherein the Prussian blue dense membrane comprises a microprous substrate layer adjacent a Prussian blue layer that in turn is adjacent a polymer layer.

* * * * *